(12) United States Patent
Huang

(10) Patent No.: US 8,287,780 B2
(45) Date of Patent: Oct. 16, 2012

(54) METHOD FOR MANUFACTURING FRESNEL LENS

(75) Inventor: Yung-Lun Huang, Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 313 days.

(21) Appl. No.: 12/749,481

(22) Filed: Mar. 29, 2010

(65) Prior Publication Data

US 2011/0156291 A1   Jun. 30, 2011

(30) Foreign Application Priority Data

Dec. 25, 2009   (CN) .......................... 2009 1 0312251

(51) Int. Cl.
 *B29D 11/00*   (2006.01)

(52) U.S. Cl. ......... 264/1.32; 264/1.1; 264/101; 264/102

(58) Field of Classification Search ................... 264/1.1, 264/1.32, 101, 102, 319
See application file for complete search history.

(56) References Cited

U.S. PATENT DOCUMENTS

| | | | |
|---|---|---|---|
| 5,277,691 A * | 1/1994 | Eaton et al. ..................... | 494/37 |
| 6,740,366 B2 * | 5/2004 | Hori et al. ..................... | 427/515 |
| 2007/0179622 A1 * | 8/2007 | Denoziere et al. ......... | 623/17.16 |

* cited by examiner

*Primary Examiner* — Galen Hauth
(74) *Attorney, Agent, or Firm* — Altis Law Group, Inc.

(57) ABSTRACT

A method for manufacturing a Fresnel lens includes the following steps: a. providing a mixture for forming the Fresnel lens; b. providing a lower mold on which the mixture is disposed; c. vacuumizing the mixture on the lower mold; d. providing an upper mold to exert a pressure on a top surface of the mixture; e. vacuumizing the mixture on the lower mold again; and f. heating the mixture on the lower mold to harden the mixture whereby the Fresnel lens can be obtained.

15 Claims, 2 Drawing Sheets

METHOD FOR MANUFACTURING FRESNEL LENS

BACKGROUND

1. Technical Field

The disclosure relates generally to a method for manufacturing improved Fresnel lens.

2. Description of Related Art

It is known to use, in order to cut down the weight and cost of wide aperture lenses, so-called Fresnel lenses are developed, in which each Fresnel lens comprises a central lenticular portion surrounded by concentrically arranged prismatic rings. In actual practice, Fresnel lenses of this general type are usually provided with a first smooth face, of either flat or conical or frustum or spherical configuration, and a second face formed with a series of saw-like teeth encircling a centrally located core lens. These teeth extend across their related Fresnel lens face as a set of concentric rings comprising a refractive portion, which has an inclination arranged to vary from one tooth to the next, or between concentric rings, and a connection slope or flank in the form of a steeply inclined front arranged to interconnect the refractive portion of one tooth with the refractive portion of an adjacent tooth.

The optical quality of Fresnel lenses essentially depends on the shape of said teeth, and in particular of said connection slopes or flanks which performing no optical functions, but merely that of interconnecting two consecutive refractive portions together are required to interfere as little as possible with the light path. In ideal technical conditions, said connection slopes or steep fronts of the teeth should extend substantially parallel to the direction of the light beam which is being transmitted through the lens, so as to induce the least possible disturbance. However, this optimum situation can not be achieved in actual practice, even when the above problem is overcome.

The Fresnel lenses are conventionally formed from a plastic by hot-press molding technique. The plastic for forming Fresnel lenses is obtained by mixing two or more solutions together. In fact, when the two or more solutions are mixed together, or when the mixture is poured into a lower mold 100 of the related mold assembly (see FIG. 2 of the present disclosure), or when the upper mold of the related mold assembly is removed from the mixture, a mass of air bubbles will be formed in the mixture for forming the Fresnel lens. FIG. 2 shows that air bubbles 110 are formed in the mixture when pouring the mixture onto the lower mold 100 of the related mold assembly. The air bubbles severely interfere with said light path. Therefore, the optical performance of the Fresnel lens is still adversely affected.

What is need therefore is a method for manufacturing Fresnel lenses which can overcome the above-mentioned disadvantages.

DETAILED DESCRIPTION

Figure 1:
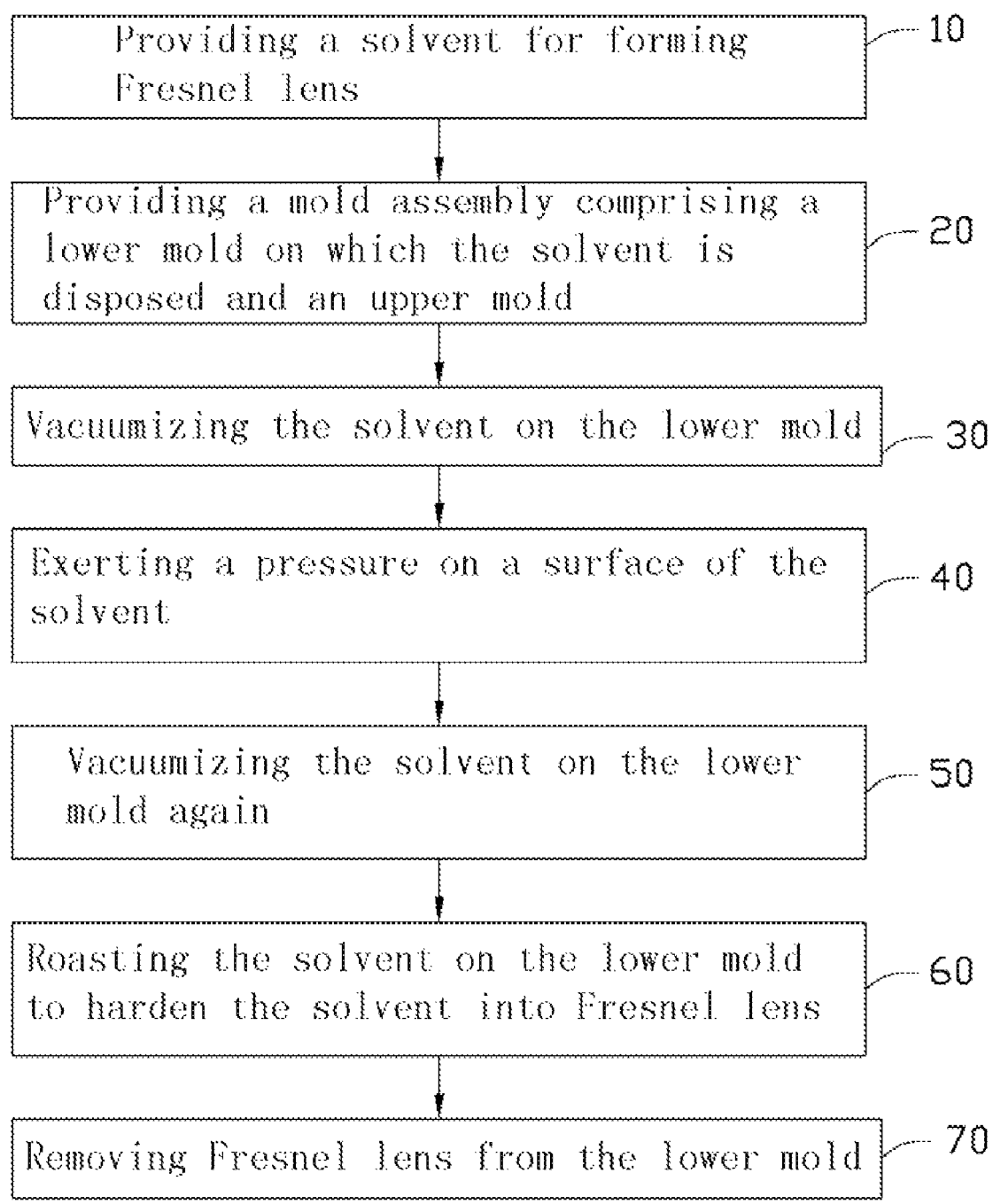
FIG. 1 is a flow chart showing steps of manufacturing a Fresnel lens in accordance with an embodiment of the disclosure.
Figure 2:
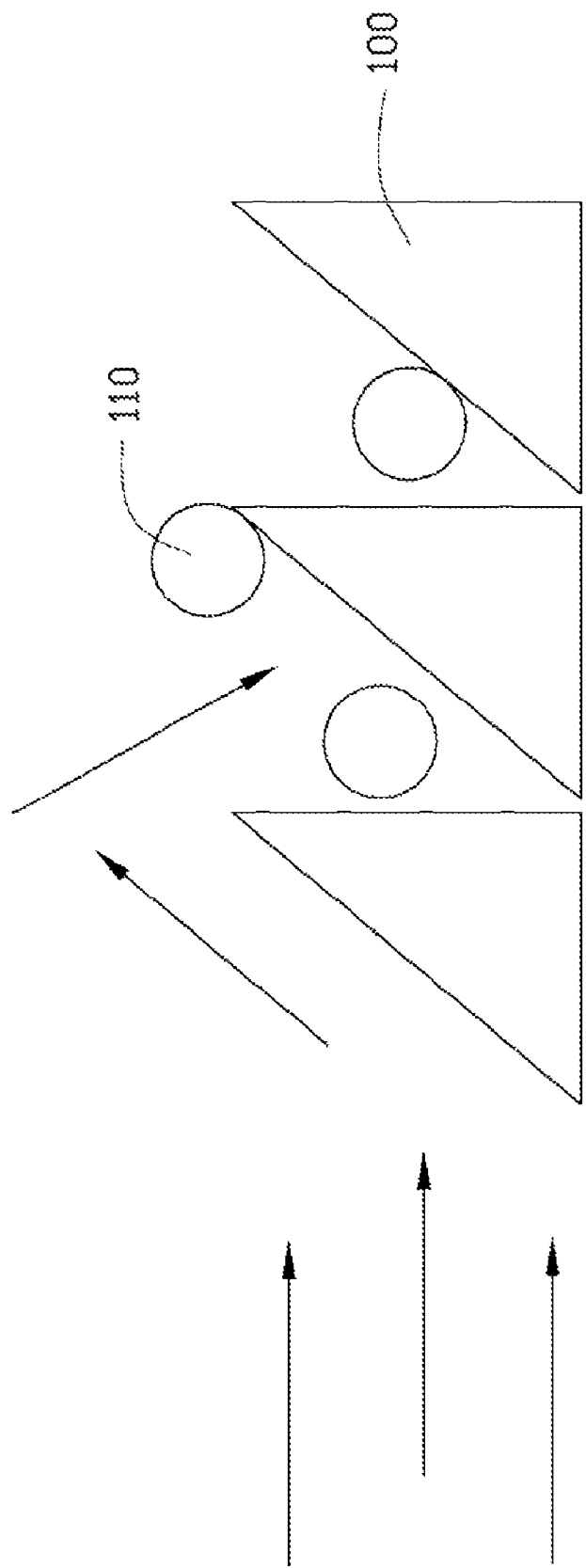
FIG. 2 is a schematic view of pouring a mixture of solutions into a lower mold in manufacturing a Fresnel lens in accordance with the related art.

FIG. 1 illustrates a method for manufacturing a Fresnel lens. The method comprises steps of vacuum processes to eliminate air bubbles in the Fresnel lens, thereby greatly improving optical performances of the Fresnel lens thus obtained.

The method of manufacturing the Fresnel lens starts with a step of providing a mixture as a main material for forming the Fresnel lens. The mixture is obtained by mixing two solutions together; the solutions include, for example, a high-polymer solution (silicon-based solution) and a linkage-activation solution. When the two liquors are mixed together, a mass of air bubbles arise and are distributed in the mixture. To firstly eliminate the air bubbles of the mixture, the mixture is preferred to be processed by a centrifugal device before the next step, which produces a centrifugal force to the mixture to force a large part of the air bubbles to leave the mixture.

In the next step, a mold assembly comprising a lower mold and an upper mold is provided. The mold assembly is a conventional mold assembly for manufacturing the Fresnel lens by hot-press molding technique of plastic. The lower mold has a plurality of concentric, annular projections formed on a top surface thereof corresponding to saw-like teeth defined in one face of the Fresnel lens. The upper mold has a flat bottom surface for pressing the mixture downwards toward the lower mold. The mixture is then poured onto the top surface of the lower mold for forming the Fresnel lens.

In the next step, the lower mold with the mixture disposed thereon is placed in a sealed cabinet, and then is vacuumized by pumping air from the sealed cabinet. The mixture is placed in vacuum condition for 10 to 30 seconds. In this embodiment, the vacuum pumping of the sealed cabinet is preferably lasted for 20 seconds. When the mixture is placed in the vacuum condition or a low pressure condition, the air bubbles expand and rise simultaneously to a surface of the mixture due to pressure difference, and then break up into a chamber of the sealed cabinet and finally exhausted by the vacuum pumping. To eliminate the air bubbles in the mixture as many as possible, the mixture is repeatedly processed through the vacuumization for 5 to 6 times. The burst of the air bubbles on the surface of the mixture could cause a local turbulence in the mixture. The local turbulence would produce new air bubbles with smaller size in the mixture, which thus need to be eliminated by further processes.

In particular, in the above step, the vacuum pumping can be alternated with vacuum breaking 5 to 6 times. After the multiple times' performance of the vacuum pumping with alternating vacuum breaking, the air bubbles can be greatly reduced. In detail, for example, for each two consecutive times of vacuumization, the pumping of the air from the sealed cabinet is stopped at the end of the 20 second period of the preceding time of vacuumization, then there is a pause, and then the sealed cabinet is opened for vacuum breaking whereby the mixture is exposed to an outside air environment; and next the pumping of the air from the sealed cabinet is started at the commencement of the 20 second period of the succeeding time of vacuumization. In addition, overall, the vacuum breaking is performed the same number of times as the vacuumization.

In the next step, the mixture placed on the lower mold is heated at a temperature of 30 to 40 Celsius degrees for 0.5 to 2 minutes, to enhance a glutinosity thereof. The mixture is preferably heated at a temperature of 35 Celsius degrees for 1 minute.

In the next step, the upper mold is moved toward the mixture to press on a top surface of the mixture to flatten the top surface of the mixture and enable the mixture to be completely snugly fitted on the top surface of the lower mold. However, when removing the upper mold from the mixture, some new air bubbles also arise in the mixture due to the surface tension of the mixture, whereby the mixture needs to be further processed through the vacuumization to eliminate the air bubbles therein.

In the next step, the lower mold with the mixture disposed thereon is placed in the sealed cabinet again, and then is vacuumized by pumping air from the sealed cabinet. The mixture is repeatedly processed through the vaccmumization for 3 to 8 times to further eliminate the air bubbles in the mixture. The mixture is placed in the vacuum condition for 2 to 10 seconds each time, wherein the vacuum pumping of the sealed cabinet is lasted for 2 to 10 seconds each time, correspondingly. In this embodiment, the mixture is preferably placed in vacuum condition for 5 second each time, wherein the vacuum pumping of the sealed cabinet is preferably lasted for 5 second each time, correspondingly.

In particular, in the above step, the vacuum pumping can be alternated with vacuum breaking 3 to 8 times. Because the air pressure alternately changes, air bubbles are further eliminated. The detailed process is, for each two consecutive times of vacuumization, the pumping of the air from the sealed cabinet is stopped at the end of the 5 second period of the preceding time of vacuumization, then there is a pause, and then the sealed cabinet is opened for vacuum breaking whereby the mixture is exposed to an outside air environment; and next the pumping of the air from the sealed cabinet is started at the commencement of the 5 second period of the succeeding time of vacuumization. In addition, overall, the vacuum breaking is performed the same number of times as the vacuumization.

In the next step, the mixture placed on the lower mold is heated in a high temperature, preferably in 150 Celsius degrees and lasted for 35 minute, to cure the mixture into a hard state.

In the final step, the Fresnel lens is obtained by removing the hardened mixture from the lower mold and then machining the hardened mixture in accordance with the predetermined processing steps.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A method for manufacturing a Fresnel lens, comprising the following steps:
   a. providing a mixture for forming a Fresnel lens;
   b. providing a lower mold on which the mixture is disposed;
   c. vacuumizing the mixture on the lower mold in a sealed cabinet by pumping air from the sealed cabinet, wherein the mixture is repeatedly vacuumized 5 or 6 times, and for each time of vacuumization the mixture is kept in vacuum condition for 20 seconds by pumping air from the sealed cabinet for 20 seconds:
   d. heating the mixture at a temperature of 35 degrees Celsius for 1 minute and then providing an upper mold to exert a pressure on a top surface of the mixture toward the lower mold;
   e. vacuumizing the mixture on the lower mold again; and
   f. heating the mixture on the lower mold to harden the mixture whereby the Fresnel lens is obtained.

2. The method of claim 1, wherein in step e, the mixture disposed on the lower mold is placed in the sealed cabinet to vacuumize the mixture again by pumping air from the sealed cabinet.

3. The method of claim 2, wherein in step e, the mixture is repeatedly processed through vacuumization 3 to 8 times.

4. The method of claim 3, wherein in step e, for each time of vacuumization the mixture is kept in vacuum condition for 5 seconds.

5. The method of claim 2 wherein in step f, the mixture placed on the lower mold is heated at a temperature of 150 degrees Celsius for 35 minutes.

6. The method of claim 1, wherein the mixture is processed by a centrifugal device before step b.

7. The method of claim 1, wherein in step c, for each two consecutive times of vacuumization, the pumping of the air from the sealed cabinet is stopped at end of the 20 second period of the preceding time of vacuumization, then there is a pause, and then the sealed cabinet is opened for vacuum breaking whereby the mixture is exposed to an outside air environment, and next the pumping of the air from the sealed cabinet is started at the commencement of the 20 second period of the succeeding time of vacuumization, and overall the vacuum breaking is performed the same number of times as the vacuumization.

8. The method of claim 4, wherein in step e, for each two consecutive times of vacuumization, the pumping of the air from the sealed cabinet is stopped at the end of the 5 second period of the preceding time of vacuumization, then there is a pause, and then the sealed cabinet is opened for vacuum breaking whereby the mixture is exposed to an outside air environment, and next the pumping of the air from the sealed cabinet is started at the commencement of the 5 second period of the succeeding time of vacuumization, and overall the vacuum breaking is performed the same number of times as the vacuumization.

9. The method of claim 1, wherein the upper mold is removed before step e.

10. The method of claim 1, wherein the mixture in step a comprises two solutions mixed together.

11. A method for manufacturing a Fresnel lens, comprising the following steps:
    a. providing a mixture for forming a Fresnel lens;
    b. providing a lower mold on which the mixture is disposed;
    c. vacuumizing the mixture on the lower mold in a sealed cabinet by pumping air from the sealed cabinet;
    d. heating the mixture at a temperature of 35 degrees Celsius for 1 minute and then providing an upper mold to exert a pressure on a top surface of the mixture toward the lower mold;
    e. vacuumizing the mixture on the lower mold again in the sealed cabinet by pumping air from the sealed cabinet, wherein the mixture is repeatedly processed through vacuumization 3 to 8 times; and
    f. heating the mixture on the lower mold to harden the mixture whereby the Fresnel lens is obtained.

12. The method of claim 11, wherein in step e, for each time of vacuumization, the mixture is kept in vacuum condition for 5 seconds by pumping air from the sealed cabinet for 5 seconds.

13. The method of claim 12, wherein in step c, the vacuumization is carried out in a sealed cabinet by pumping air from the sealed cabinet, the mixture is repeatedly vacuumized 5 or 6 times, for each time of vacuumization the mixture is kept in vacuum condition for 20 seconds by pumping air from the sealed cabinet for 20 seconds, for each two consecutive times of vacuumization, the pumping of the air from the sealed cabinet is stopped at the end of the 20 second period of the preceding time of vacuumization, then there is a pause; and then the sealed cabinet is opened for vacuum breaking whereby the mixture is exposed to an outside air environment, and next the pumping of the air from the sealed cabinet is started at the commencement of the 20 second period of the succeeding time of vacuumization, and overall the vacuum breaking is performed the same number of times as the vacuumization.

14. The method of claim 13, wherein in step e, for each two consecutive times of vacuumization, the pumping of the air from the sealed cabinet is stopped at the end of the 5 second period of the preceding time of vacuumization, then there is a pause, and then the sealed cabinet is opened for vacuum breaking whereby the mixture is exposed to an outside air environment, and next the pumping of the air from the sealed cabinet is started at the commencement of the 5 second period of the succeeding time of vacuumization, and overall the vacuum breaking is performed the same number of times as the vacuumization.

15. A method for manufacturing a Fresnel lens, comprising the following steps:

a. providing a mixture for forming a Fresnel lens;
b. providing a lower mold on which the mixture is disposed;
c. vacuumizing the mixture on the lower mold in a sealed cabinet by pumping air from the sealed cabinet, wherein the mixture is repeatedly vacuumized 5 or 6 times, and for each time of vacuumization the mixture is kept in vacuum condition for 20 seconds by pumping air from the sealed cabinet for 20 seconds;
d. heating the mixture at a temperature of 30 to 40 degrees Celsius for 0.5 minutes to 2 minutes, and then providing an upper mold to exert a pressure on a top surface of the mixture toward the lower mold;
e. vacuumizing the mixture on the lower mold again in the sealed cabinet by pumping air from the sealed cabinet, wherein the mixture is repeatedly processed through vacuumization 3 to 8 times, and for each time of vacuumization the mixture is kept in vacuum condition for 5 seconds by pumping air from the sealed cabinet for 5 seconds; and
f. heating the mixture on the lower mold to harden the mixture whereby the Fresnel lens is obtained.

* * * * *